(12) United States Patent
Zinn et al.

(10) Patent No.: US 7,198,839 B2
(45) Date of Patent: *Apr. 3, 2007

(54) CERAMIC FIBER INSULATION IMPREGNATED WITH AN INFRA-RED RETARDANT COATING AND METHOD FOR PRODUCTION THEREOF

(75) Inventors: Alfred A. Zinn, Huntington Beach, CA (US); Ryan Jeffrey Tarkanian, Westminster, CA (US)

(73) Assignee: The Boeing Company, Seattle, WA (US)

( * ) Notice: Subject to any disclaimer, the term of this patent is extended or adjusted under 35 U.S.C. 154(b) by 478 days.

This patent is subject to a terminal disclaimer.

(21) Appl. No.: 10/222,503

(22) Filed: Aug. 16, 2002

(65) Prior Publication Data

US 2004/0038029 A1 Feb. 26, 2004

(51) Int. Cl.
*B32B 17/12* (2006.01)
*B05D 3/02* (2006.01)

(52) U.S. Cl. .................. 428/293.4; 428/688; 501/95.1; 501/95.2; 427/372.2; 427/430.1

(58) Field of Classification Search .............. 428/312.6, 428/688; 427/372.2, 430.1
See application file for complete search history.

(56) References Cited

U.S. PATENT DOCUMENTS

| | | | |
|---|---|---|---|
| 3,640,093 A * | 2/1972 | Levene et al. ................. 65/17.2 |
| 3,702,279 A * | 11/1972 | Ardary et al. ............... 428/338 |
| 3,993,835 A | 11/1976 | Miedaner | |
| 4,058,485 A | 11/1977 | Cheung | |
| 4,193,793 A | 3/1980 | Cheung | |
| 4,358,486 A * | 11/1982 | Ecord et al. ................. 427/379 |
| 5,041,321 A * | 8/1991 | Bendig ....................... 428/102 |
| 5,198,282 A * | 3/1993 | Baker et al. ................. 428/114 |
| 5,352,517 A | 10/1994 | Clough et al. | |
| 5,603,983 A | 2/1997 | Clough et al. | |
| 5,756,207 A | 5/1998 | Clough et al. | |
| 5,800,925 A | 9/1998 | Ando et al. | |
| 5,849,650 A * | 12/1998 | Rorabaugh et al. ........... 501/80 |
| 5,863,846 A * | 1/1999 | Rorabaugh et al. ......... 442/136 |
| 5,985,433 A | 11/1999 | Leiser et al. | |
| 6,124,026 A | 9/2000 | McCurdy et al. | |
| 6,139,916 A | 10/2000 | Saruhan-Brings et al. | |
| 6,165,336 A * | 12/2000 | Maki et al. .................. 204/415 |
| 6,339,034 B1 * | 1/2002 | Hsu et al. ...................... 501/80 |
| 6,620,749 B2 * | 9/2003 | Hsu et al. ...................... 501/80 |
| 6,770,584 B2 * | 8/2004 | Barney et al. ............. 501/95.1 |
| 2004/0038029 A1 * | 2/2004 | Zinn et al. .................. 428/375 |

* cited by examiner

*Primary Examiner*—Jill Gray
(74) *Attorney, Agent, or Firm*—Alston & Bird LLP

(57) ABSTRACT

The invented insulation is a ceramic fiber insulation wherein the ceramic fibers are treated with a coating which contains transition metal oxides. The invented process for coating the insulation is a process of applying the transition metal oxide coating to the fibers of the insulation after the fibers have been formed into a tile or other porous body. The coating of transition metal oxide lowers the transmittance of radiation through the insulation thereby lowering the temperature of the backface of the insulation and better protecting the structure that underlies the insulation.

31 Claims, 7 Drawing Sheets

CERAMIC FIBER INSULATION IMPREGNATED WITH AN INFRA-RED RETARDANT COATING AND METHOD FOR PRODUCTION THEREOF

FEDERALLY SPONSORED RESEARCH OR DEVELOPMENT

This invention was made under Contract No: NAS 9-200000, WBS 1.7.8.8 awarded by NASA. The government has certain rights in this invention.

FIELD OF THE INVENTION

This invention relates to fibrous ceramic insulation such as but not limited to rigid tiles, flexible blankets, and gap fillers wherein the individual ceramic fibers are coated with an IR retardant material containing transition metal oxide phases.

BACKGROUND OF THE INVENTION

Reusable launch vehicles (RLVs), such as the space shuttle, repeatedly travel into or beyond the earth's upper atmosphere and then return to the earth's surface. During each mission, the RLVs experience extreme temperatures, ranging from −250° F. while in orbit to more than 2000° F. upon re-entry into the Earth's atmosphere. Certain areas of the RLV, such as the Wing Leading Edge (WLE), experience localized heating that can exceed 3000° F. Because of the extreme temperatures, the vehicle and its contents must be protected by a thermal protection system (TPS). The TPS is an outer covering of insulation, the purpose of which is to prevent the inner load-carrying structure of the vehicle from reaching/exceeding a certain maximum temperature. For the space shuttle the temperature limit is set by the lightweight aluminum structure of the shuttle, which begins to weaken at temperatures above 350° F.

Thermal protection systems for RLVs consist of a large number, usually around 20,000, of insulative tiles. The tiles function to insulate the vehicle from the environment and to radiate heat away from the vehicle. In addition to protecting the vehicle from environmental heat sources, the insulative tiles also provide protection from localized heating from such sources as the vehicle's main engines, rocket boosters, and directional thrusters.

The current state-of-the-art insulative tile material used on the orbiter fleet is Lockheed's LI-900™ material, an all silica rigid fibrous tile material. The LI-900™ material has outstanding thermal heat transfer characteristics and has a low coefficient of thermal expansion (CTE). However, it has a number of drawbacks such as low strength and relatively low thermal stability, which leads to sintering and shrinkage upon high thermal exposure. It is used only in areas of the TPS where temperatures do not exceed 2400° F. All areas exposed to a higher temperature are fitted with high temperature composites, which are very high in cost.

To overcome the drawbacks associated with LI-900™ tiles and to expand the use of economic tile TPS, alumina enhanced thermal barrier (AETB) was developed. AETB is a rigid, three-component tile material comprising silica fibers, alumina fibers, and aluminoborosilicate fibers. AETB is a preferred insulative material because it exhibits higher strength, higher thermal stability, and higher sintering and shrinkage resistance than LI-900™ tile. However, the AETB suffers from high thermal heat transfer and a large coefficient of thermal expansion. The greatest advantage of AETB is its ability to receive reaction cured glass (RCG) and toughened unipiece fibrous insulation (TUFI) coatings, which greatly increases its surface strength making it much easier to handle and gives it much improved impact resistance. However, its relative high heat transfer rate prevents its widespread use.

The shortcomings in LI-900™ tile and AETB tile led to the development of yet another insulative tile material: Boeing Rigid Insulation™ (BRI). Like AETB material, BRI™ material is a combination of silica and alumina fibers. BRI™ tile, however, includes boron carbide, which allows for more effective bonding of the fibers of the insulation. Further, BRI tile is produced in a manner which orients the fibers in a plane roughly perpendicular to the flow of heat through the tile, resulting in a tile with higher strength than LI-900™ tile and better thermal heat transfer properties than AETB tile.

Both AETB and BRI™ tiles are extremely porous, containing between 90% and 96% of void space per volume of material. The tremendous amount of void space within the insulation is responsible for the observed low thermal conduction of the tiles. However, the low density of the tiles is a double edged sword. Such tiles contain so much empty space that a high degree of heat may be allowed to move through the insulation in the form of radiation, lowering the effectiveness of the low density insulative tile. The radiation is of significance, since radiant heat transfer is the predominant heat transfer mechanism at temperatures above about 1000° F.

To further improve the thermal insulating properties of ceramic fiber insulation materials, a method is needed that enhances the thermal properties of silica and alumina fiber insulation by reducing the ability of heat to radiate through such a material. What is further needed is a method of reducing the ability of heat to radiate through the insulation without adversely affecting the mechanical properties of the insulation or adding substantially to the weight of the insulation.

SUMMARY OF THE INVENTION

The invented insulation is a ceramic fiber insulation wherein the ceramic fibers are coated with an IR retardant coating which contains transition metal oxide phase(s). The invented process for coating the insulation is a process of applying the IR retardant coating to the fibers of the insulation after the fibers have been formed into a tile or other porous body. The IR retardant coating of transition metal oxide lowers the transmittance of visible and IR radiation through the insulation thereby lowering the temperature of the backface of the insulation and better protecting the structure that underlies the insulation.

In general, a porous ceramic fiber tile is treated with a coating containing transition metal oxides by first creating a sol mixture of a silane based gelling agent, one or more transition metal precursors, and a water/ethanol solvent. The sol is allowed to permeate the porous tile. Then, the gelling agent of the sol is polymerized within the tile by heat treatment. After solvents and byproducts of the polymerization are allowed to escape the tile, another heat treatment converts the transition metal oxide precursors trapped within the polymerized sol into transition metal oxides. Further heat treatment transforms the polymerized silane based gelling agent into a xerogel type silica matrix which contains the transition metal oxides and which is bound to the underlying ceramic fibers of the tile.

The sol mixture is produced by mixing a tetra-alkoxy silane gelling agent, one or more transition metal oxide precursors, and a water/ethanol solvent mixture. The tetraalkoxy silane is preferably tetra-ethoxy silane (TEOS) or tetra-methoxy silane (TMOS). The transition metal oxide precursor is any transition metal compound which is readily converted into its respective oxide, which oxide is highly absorbant and/or opaque to IR radiation. Examples of the precursors include but are not limited to halides, nitrates, carbonates, sulfates, acetates, formiates, acetylacetonates, and alkoxides, with chlorides and nitrates being the preferred precursors due to their ready dissolution in water/EtOH solvent mixtures.

After the transition metal oxide precursor and gelling agent are dispersed within the mixture, the mixture is optionally prepolymerized in order to increase the viscosity of the sol and allow for easier coating of the tile. Prepolymerization is most easily accomplished by heating the sol to a boil for what is typically 60 to 90 minutes, but which can be shorter or longer depending on the silica gelling agent to solvent ratio. Boiling is typically continuted until the first signs of gelling are observed, usually in the form of a skin on the surface of the liquid.

The uncoated insulative tile is provided in the form of an insulative material composed of lightly packed ceramic fibers. The insulative material is composed of silica fibers and alumina fibers, alone or in combination, and may optionally contain borosilicate, boron carbide, or other types of ceramic fibers such as, but not limited to, zirconia, titania, or complex mixed oxide fibers.

It is contemplated that the insulative tile may be commercially available ceramic fiber tile, blanket, and/or gap filler insulation such as alumina enhanced thermal barrier (AETB) tile, and preferably Boeing Rigid Insulation™ tile (BRI). In any case, the insulation is provided in the form of a porous body which is from about 1 to several inches thick, and may be from several inches to several feet in length and width. The tiles are extremely lightweight, from about 6 lbs/ft$^3$ to about 20 lbs/ft$^3$, and extremely porous, containing up to 96% free space by volume.

To coat the fibers of a given porous ceramic tile, the tile is partially or completely submerged in the hot sol mixture depending on which portion of the tile is to be coated. The pores within the tile support a capillary effect, which causes the sol mixture to wick from the surface to the internal portions of the tile rather rapidly. The degree to which the sol penetrates the tile depends upon the porosity of the tile, the viscosity of the sol mixture, the time allowed for penetration, and the amount of sol used.

After the sol mixture is allowed to penetrate the tile to the desired degree, the silane gelling agent is polymerized within the tile by initially heating the tile to a temperature of approximately 200° F. and then increasing the temperature to approximately 900° F. over a 12 to 24 hour period. Polymerization within thicker tiles will take considerably longer than the polymerization within thinner tiles. Due to the polymerization of the gelling agent, the liquid sol becomes a very viscous fluid, and eventually solidifies within the tile.

While the gelling agent polymerizes, the dissolved transition metal oxide precursors become incorporated into the solid silica polymer network of the tile. The polymerization and solidification of the gelling agent within the tile acts to prevent the transition metal oxide precursors from escaping during the heating of the tile.

Subsequent to the silane polymerization heat treatment, byproducts of the polymerization and residual solvent must be removed from the tile. The byproducts and solvent are preferably removed by heating the tile for about 24 hours at about 250° F. to 300° F.

After the solvents have been removed from the tile, the mixed Metal oxide precursors are converted to the metal oxide containing phase and intimate chemical bonding to the fibers is induced with an oxide heat treating step. The temperature required to form the oxide depends most heavily upon the substituent of the precursor. For instance, nitrate precursors may be oxidized between about 200° F. and 500° F., while chloride precursors require a temperature of approximately 1500° F. to ensure complete conversion to the oxide and complete removal of the chloride.

After the oxide precursors are reacted to form transition metal oxide constituents, the polymerized tetra-alkoxy silane is transformed into a xerogel-like silica matrix which contains the transition metal oxides and is chemically bonded to the surface of the silicate, aluminate, borosilicate, or other ceramic fibers within the insulation to form one integral unit. This final step is carried out by heating the polymerized silane to a temperature above about 1500° F.

The ceramic fibers within the resulting insulation are coated with a well dispersed transition metal oxide containing IR retardant coating. The chemical bonding to the fibers is such that the coating is not removed by temperature cycling or vibroacousting turbulence encountered during launch, in flight, and during re-entry of an insulated vehicle.

The IR retardant coating reduces the transmittance of thermal radiation through the ceramic fiber insulation. It has been found that tiles having coated fibers have a reduced backface temperature response when compared to similar uncoated tiles subjected to identical heat conditions. The coating provides a significant increase in insulative ability of the tile without significantly increasing the weight of the tile or detracting from the mechanical properties of the tile.

BRIEF DESCRIPTION OF THE DRAWINGS

Figure 1:
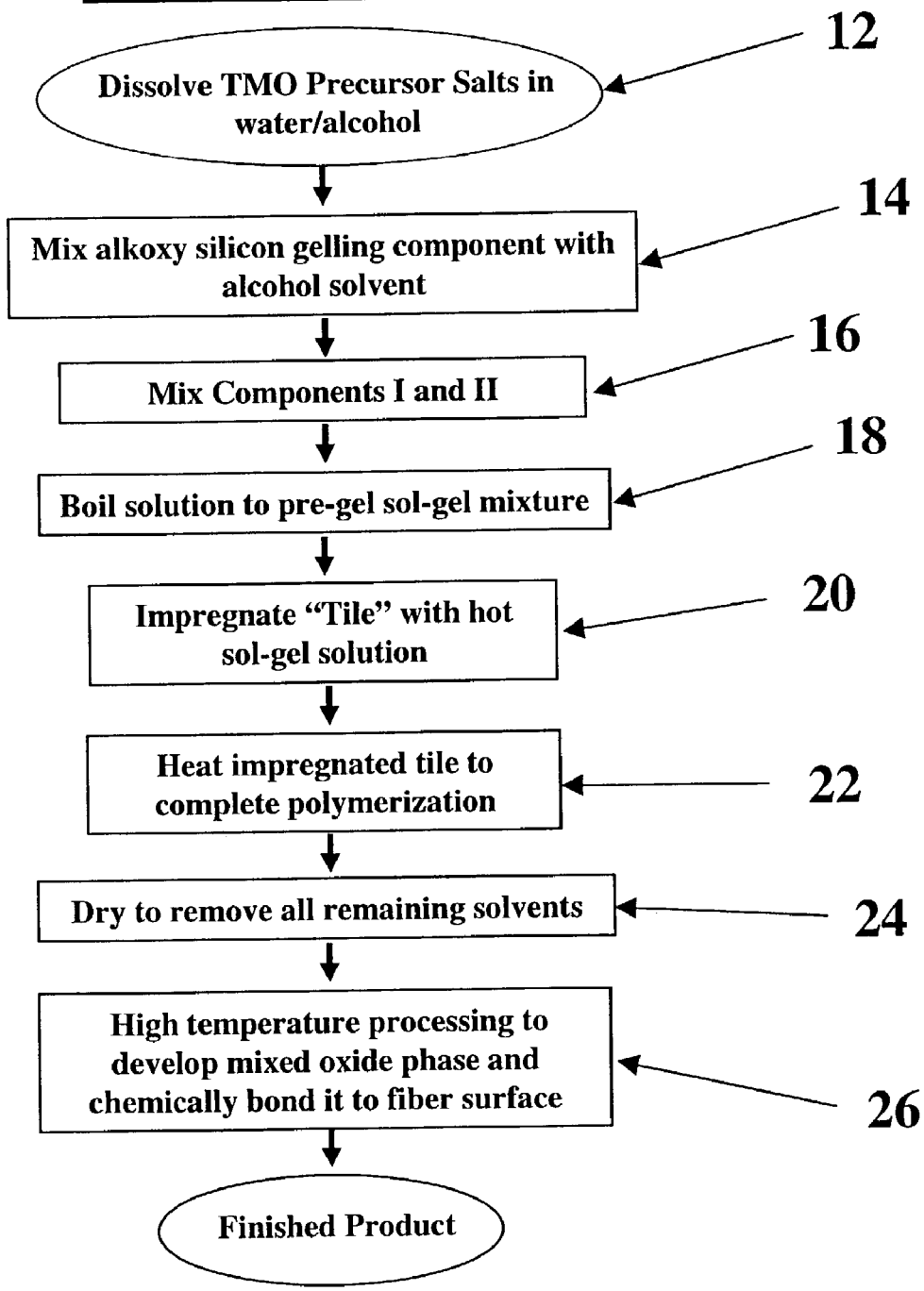

Having thus described the invention in general terms, reference will now be made to the accompanying drawings, which are not necessarily drawn to scale, and wherein:

FIG. 1 illustrates an exemplary method of coating the fibrous insulation with a transition metal oxide in accordance with an embodiment of the invention (flow chart).

Figure 2:
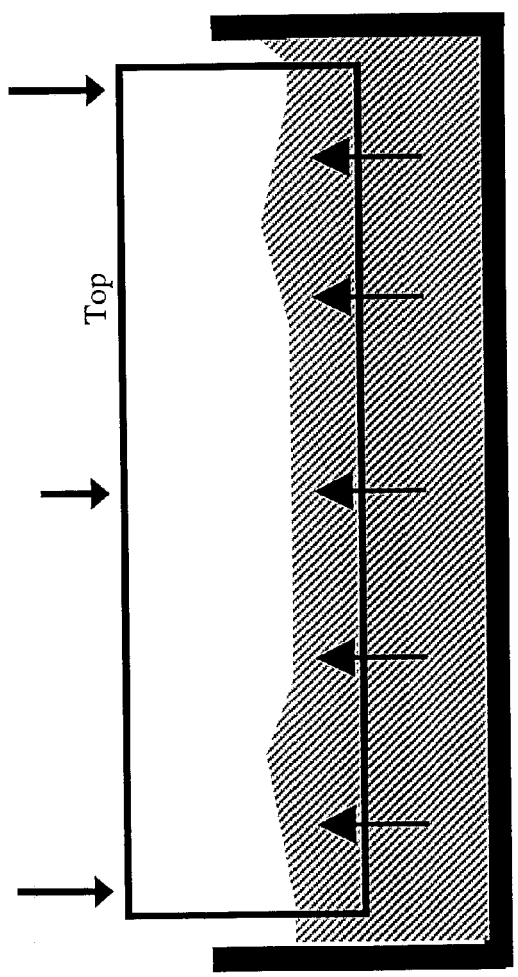
Figure 2:
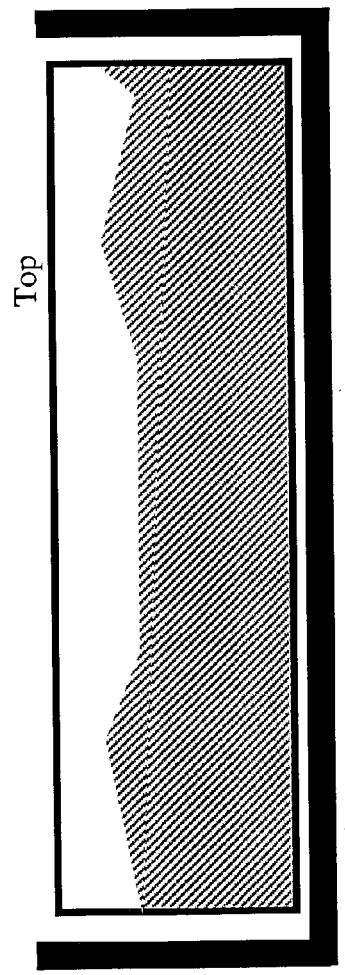

FIG. 2 illustrates the possible adjustment of impregnation depth in accordance with an embodiment of the invention.

Figure 3A:
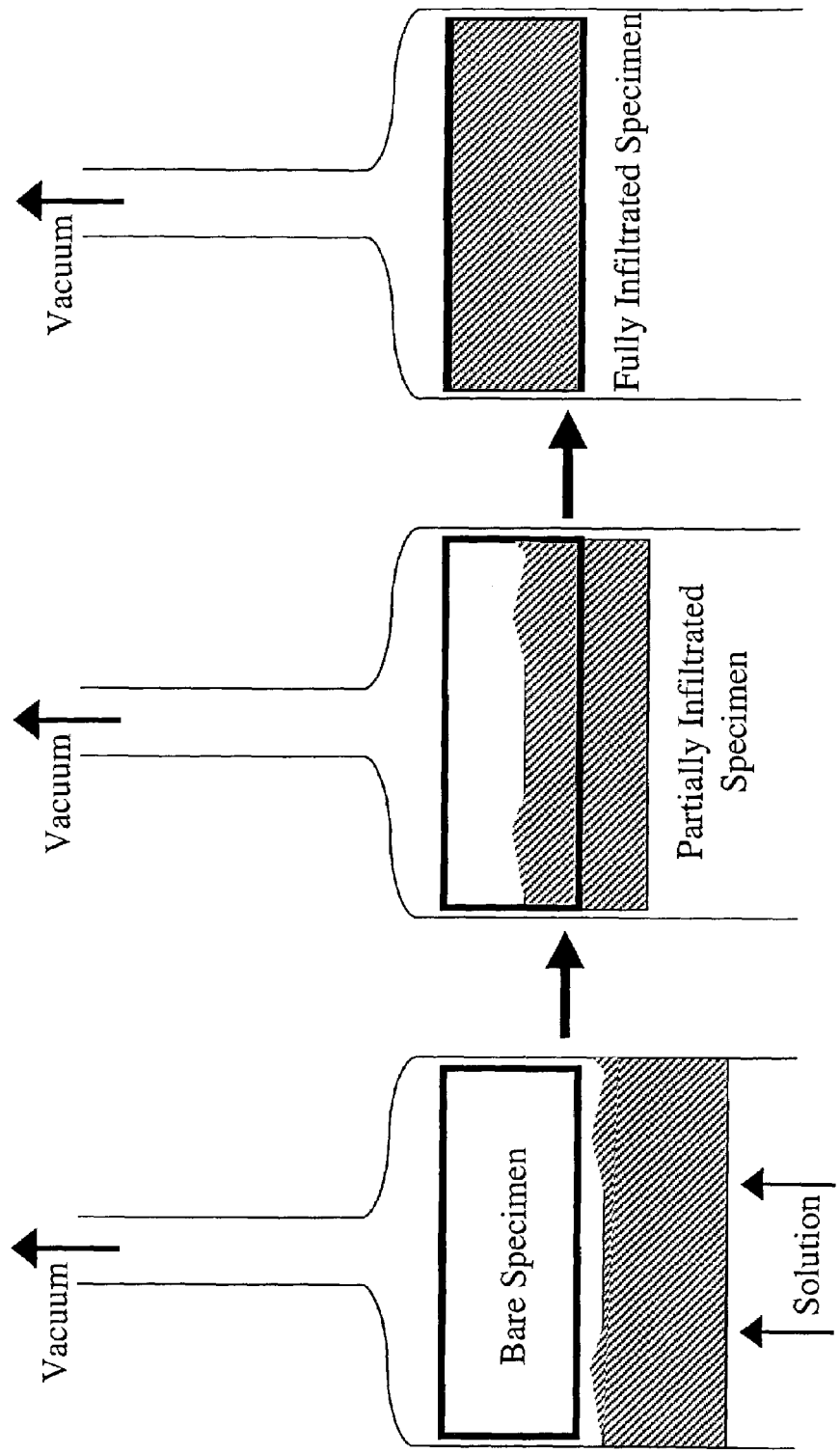

FIG. 3a schematically illustrates how a vacuum can be used to aide infiltration of a tile in accordance with an embodiment of the invention.

Figure 3B:
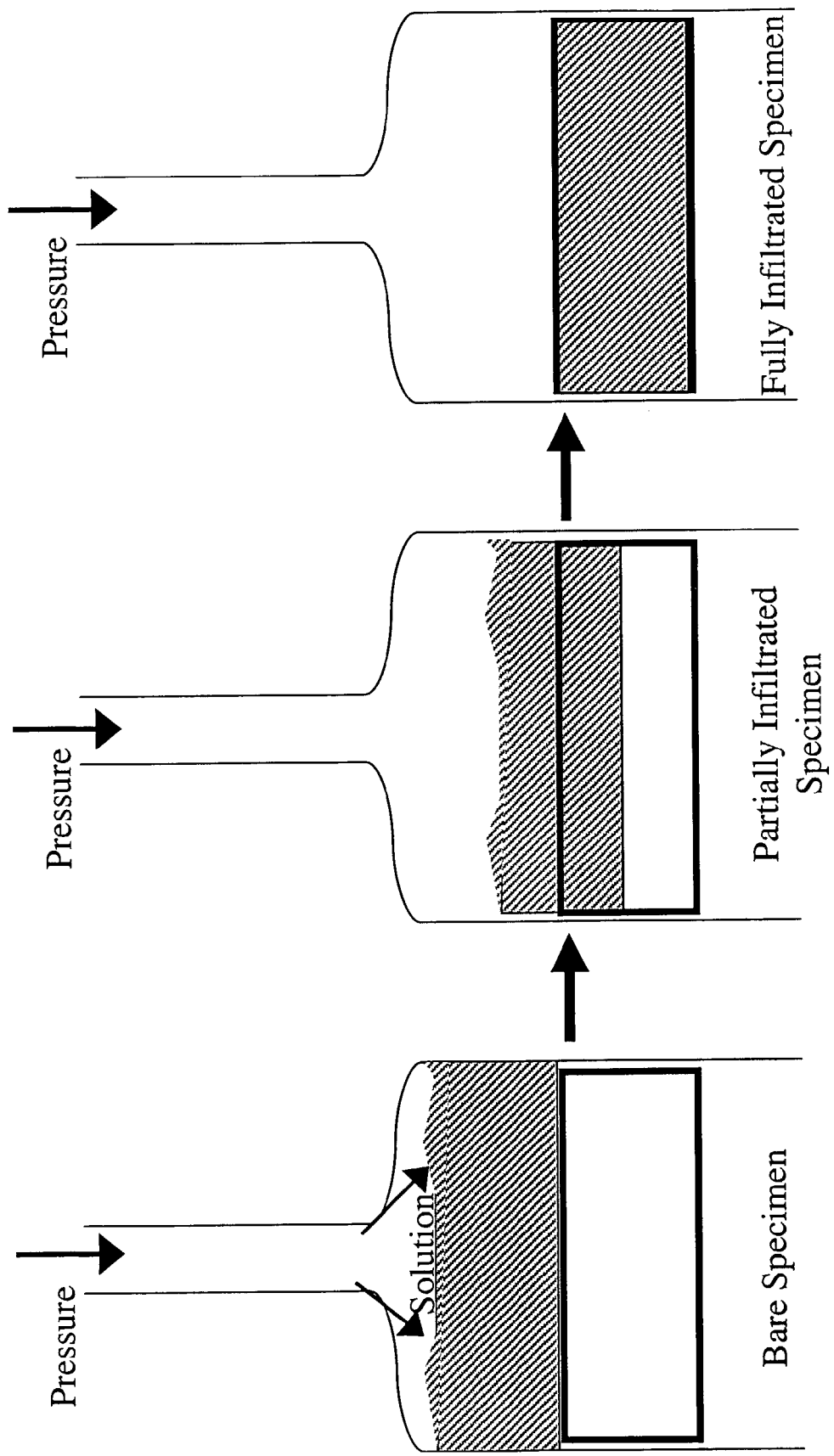

FIG. 3b schematically illustrates how pressure can be used to aide infiltration of a tile in accordance with an embodiment of the invention.

Figure 4:
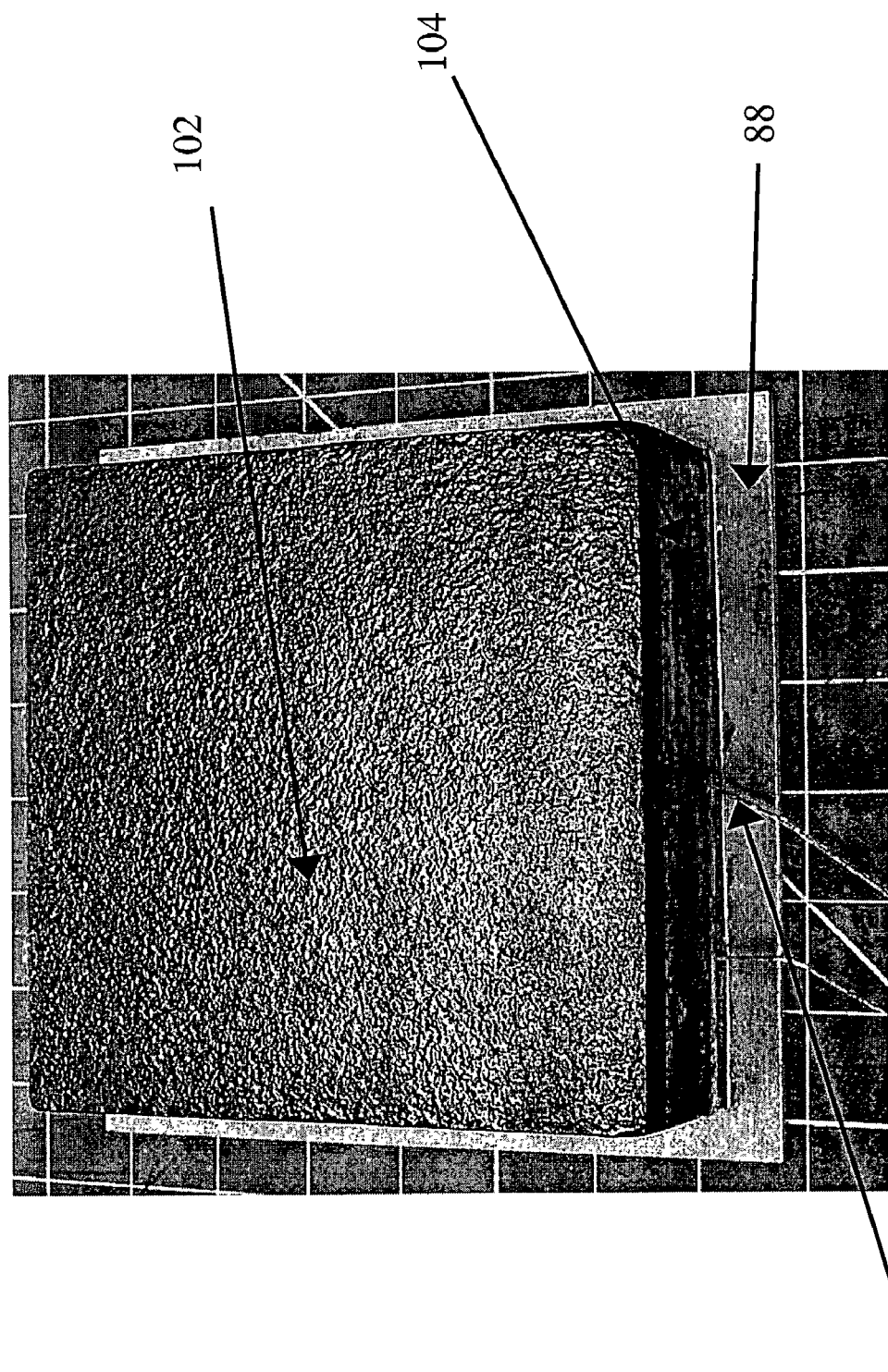
Figure 5:
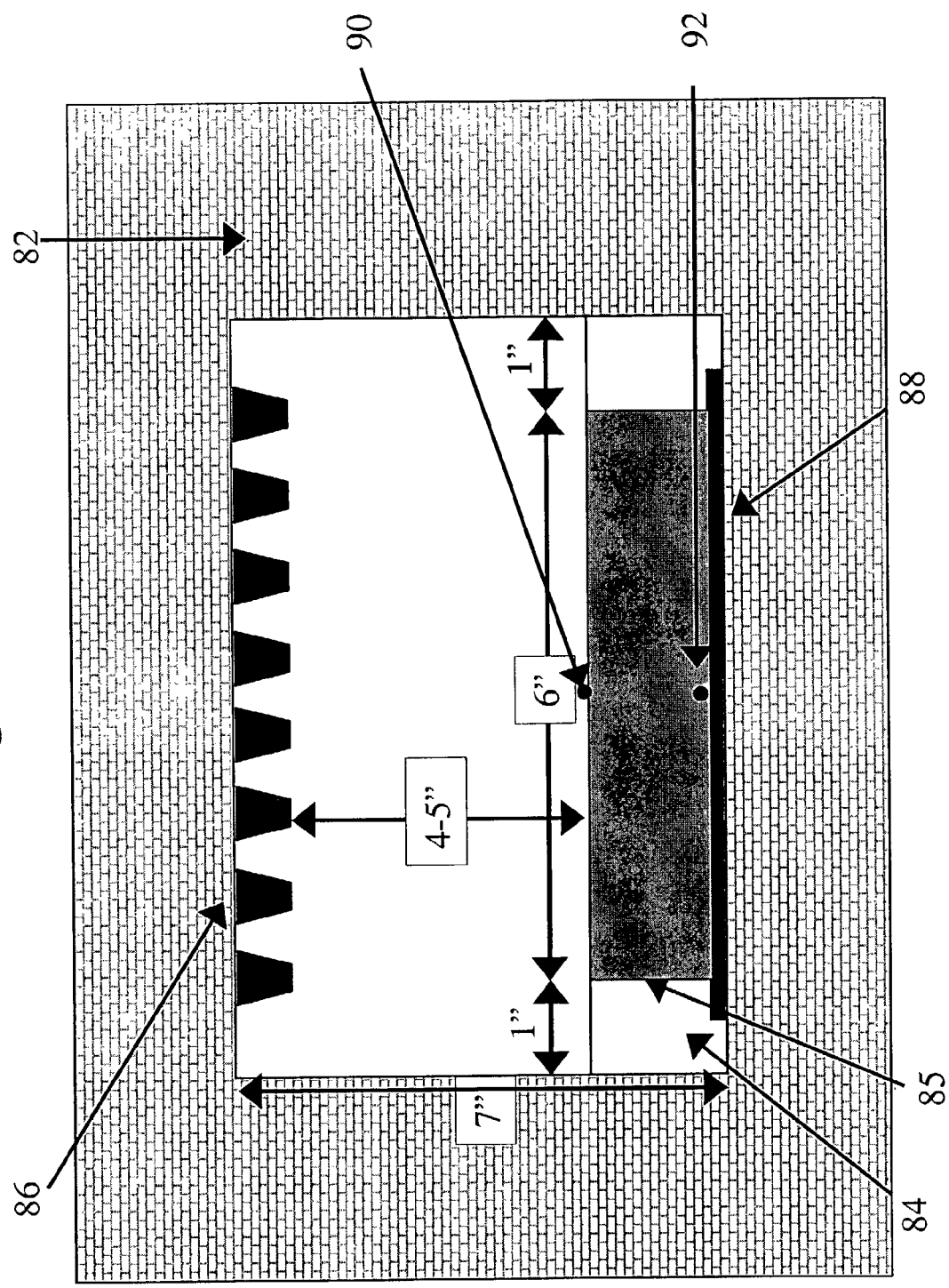

FIG. 4 shows an example of a 6"×6"×2" tile produced in accordance with the invention FIG. 5 shows a schematic of the radiant heat setup used for testing tiles of the invention.

Figure 6:
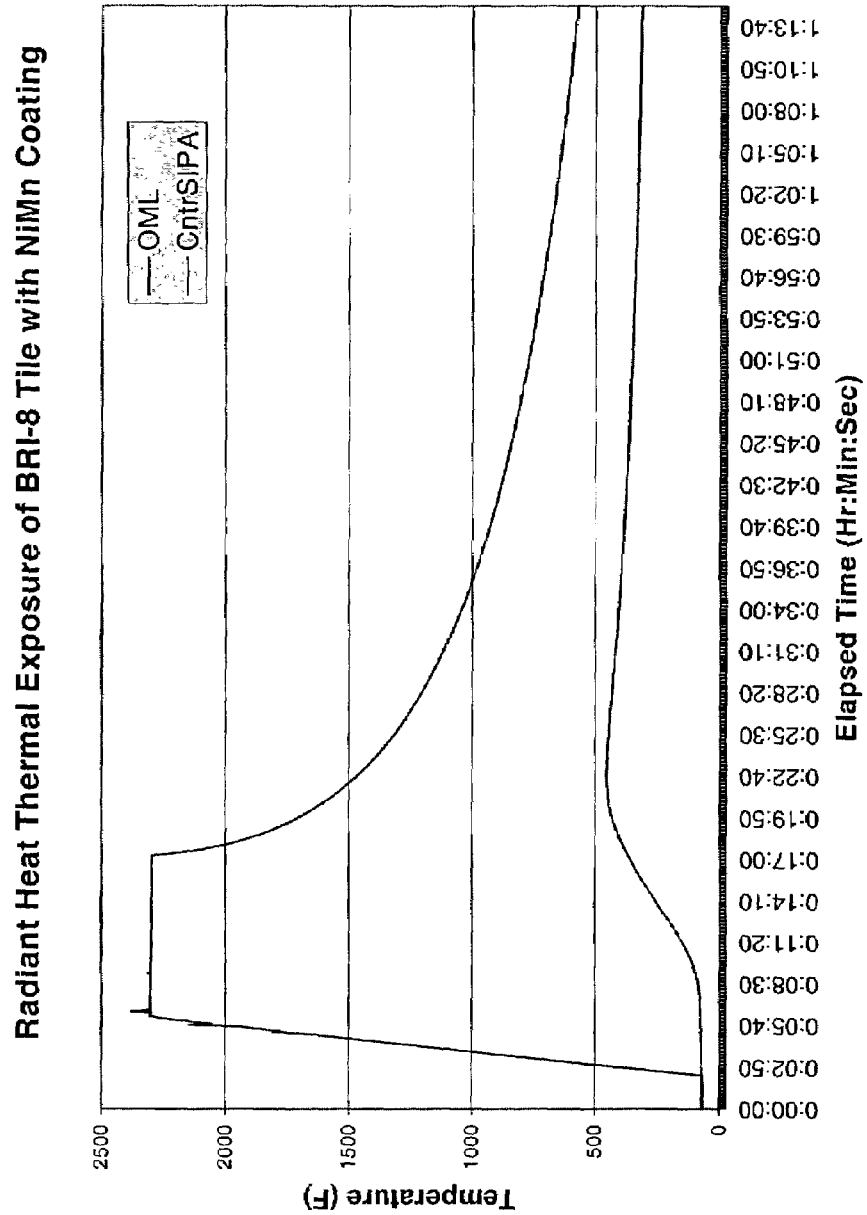

FIG. 6 shows a sample plot of BFTR measurement using a radiant heat setup the heat setup used to test tiles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a sol mixture containing a tetra-alkoxy silane gelling agent, a transition metal oxide precursor mixture, ethanol (or isopropanol, and water are mixed 12. The tetra-alkoxy silane gelling agent is preferably tetra-ethoxy silane (TEOS) or tetra-methoxy silane (TMOS). The gelling agent component of the sol polymerizes upon heating and is first used as a solvent to carry the transition metal oxide precursor into the insulation tile and later to hold the precursor within the insulation tile during oxidation of the precursor. Because the gelling agent must first be used as a solvent to carry the precursor into the porous insulation material, the initial viscosity of the gelling agent must be relatively low.

In one embodiment of the invention, the transition metal oxide precursor salts are first dissolved in the alcohol/water solution 12. In a separate step, the alkoxy silicon gelling agent is mixed with an alcohol/water solvent 14. The TMO precursor mixture is then mixed with the gelling agent and alcohol 16.

The transition metal oxide precursor can be any transition metal compound which is readily converted upon heating to its respective transition metal oxide. Examples of precursors include but are not limited to halides ($M^{+x}Hal_x$, where M represents a transition metal and Hal represents $F^-$, $Cl^-$, $Br^-$, or $I^-$), nitrates ($M^{+x}(NO_3)_x$), carbonates ($M^{+x}(CO_3)_{0.5x}$ and $M^{+x}(HCO_3)_x$), sulfates ($M^{+x}(SO_4)_{0.5x}$), acetates ($M^{+x}(CH_3CO_2)_x$), formiates ($M^{+x}(HCO_2)_x$), acetylacetonates ($M^{+x}(C_5H_7O_2)_x$), and alkoxides ($M^{+x}(C_zH_{2z+1}CH_2O)_x$). By way of example, suitable transition metal oxide precursors include $NiCl_2$, $MnCl_2$, $Fe(NO_3)_3$, $Co(NO_3)_2$, $MnCO_3$, $Cr(NO_3)_3$, and $NH_4VO_3$. The precursors are solids at room temperature and are dissolved and intimately mixed with the alkoxy gelling agent and the solvents prior to processing to achieve molecular distribution in the sol mixture and in the impregnated porous body.

Nitrates and chlorides are the preferred precursors due to the low conversion temperature of the nitrates and the predictable conversion characteristics of the chloride oxidation. In addition, they are usually very soluble in water/alcohol solvent mixtures. Nitrates are particularly preferred because they convert to an oxide phase within the temperature range of about 200° F. to about 500° F. For the sake of comparison, conversion of chloride precursors to the respective oxide typically occurs at about 1500° F. or higher. By way of example, several exemplary transition metal precursors which may be used in accordance with this invention are shown below. M represents the chosen transition metal:

| Halide Precursor (fluorides, chlorides, bromides, iodides) |
|---|

General (Chloride):

$$M^{+x}Cl_x + 0.5xH_2O \xrightarrow{\Delta} MO_{0.5x} + xHCl$$

Specific example:

$$2\,Fe^{+3}Cl_3 + 3H_2O \xrightarrow{\Delta} Fe_2O_3 + 6HCl$$

Nitrate Precursors ($M^{+x}(NO_3)_x$)

General:

$$M^{+x}(NO_3)_x + 0.5xH_2O \xrightarrow{\Delta} MO_{0.5x} + xHNO_3$$

Specific example:

$$2\,Fe^{+3}(NO_3)_3 + 3H_2O \xrightarrow{\Delta} Fe_2O_3 + 6HNO_3$$

Carbonate Precursors ($M^{+x}(CO_3)_{0.5x}$ and $M^{+x}(HCO_3)_x$)

General:

$$M^{+x}(CO_3)_{0.5x} \xrightarrow{\Delta} MO_{0.5x} + 0.5CO_2$$

Specific example:

$$Fe_2(CO_3)_3 \xrightarrow{\Delta} Fe_2O_3 + 3CO_2$$

Sulfate Precursors ($M^{+x}(SO_4)_{0.5x}$)

General:

$$M^{+x}(SO_4)_{0.5x} \xrightarrow{\Delta} MO_{0.5x} + 0.5SO_3 \text{ (and/or } SO_2)$$

Specific example:

$$Fe_2(SO_4)_3 \xrightarrow{\Delta} Fe_2O_3 + 0.5SO_3 \text{ (and/or } SO_2)$$

Acetate Precursors ($M^{+x}(CH_3CO_2)_x$)

General:

$$M^{+x}(CH_3CO_2)_x + 2xO_2 \xrightarrow{\Delta} MO_{0.5x} + 2xCO_2 + 1.5xH_2O$$

Specific example:

$$2\,Fe^{+3}(CH_3CO_2)_3 + 12O_2 \xrightarrow{\Delta} Fe_2O_3 + 12CO_2 + 9H_2O$$

Formiate Precursors ($M^{+x}(HCO_2)_x$)

General:

$$M^{+x}(HCO_2)_x + 0.5xO_2 \xrightarrow{\Delta} MO_{0.5x} + xCO_2 + 0.5xH_2O$$

Specific example:

$$2\,Fe^{+3}(HCO_2)_3 + 3O_2 \xrightarrow{\Delta} Fe_2O_3 + 6CO_2 + 3H_2O$$

-continued

Acetylacetonate Precursors $(M^{+x}(C_5H_7O_2)_x)$

General:
$$M^{+x}(C_5H_7O_2)_x + 6xO_2 \xrightarrow{\Delta} MO_{0.5x} + 5xCO_2 + 3.5xH_2O$$

Specific example:
$$2\,Fe^{+3}(C_5H_7O_2)_3 + 36O_2 \xrightarrow{\Delta} Fe_2O_3 + 30CO_2 + 21H_2O$$

Alkoxide Precursors $(M^{+x}(C_zH_{2z+1}CH_2O)_x)$

General:
$$M^{+x}(C_zH_{2z+1}CH_2O)_x + (1.5x(1+z))O_2 \xrightarrow{\Delta} MO_{0.5x} + 4xCO_2 + 5xH_2O$$

Specific example:
$$2\,Fe^{+3}(C_2H_5O)_3 + 18O_2 \xrightarrow{\Delta} Fe_2O_3 + 12CO_2 + 15H_2O$$

The sol mixture contains about 2% to about 5% TMO precursor, about 4% to about 10% alkoxy silane, between about 75% and about 85% water, about 7% to about 9% alcohol, and about 1% to about 3% acid such as nitric acid or HCl. An exemplary mixture is 2.5–3.5% precursor, 5.7% TEOS, 80% water, 8.1% isopropanol, and 2.7% nitric acid or HCl (all by weight %). The precursor is well dispersed within the sol by stirring using a magnetic stir bar to form a perfect solution. After mixing, the precursors are completely dissolved ensuring even molecular distribution throughout the sol.

The acid of the mixture acts as a catalyst in the polymerization of the gelling agent. Base catalysts may also be used with this invention, though acid catalysts have shown much better results.

The mixture is optionally pre-polymerized 18 in order to increase the viscosity of the sol so that the sol may better penetrate the porous ceramic tile. Pre-polymerization is accomplished by heating the mixture to boiling for approximately 60 to 90 minutes. Typically, the solution is heated to boiling in a partially covered vessel to minimize solvent losses due to evaporation. As soon as signs of gelling occur (usually thin layer on top of solution), the mixture is readied for coating of the ceramic tile.

A porous ceramic fiber insulating tile is provided. As used herein "tile" is used to describe any shape or formation of an insulative material composed of lightly packed ceramic fibers. The tile is composed of silica fibers and alumina fibers, alone or in combination, and may optionally contain borosilicate fibers, boron carbide, and other additional components. A number of porous ceramic fiber insulation tiles are commercially available, including alumina enhanced thermal barrier (AETB) tile, which is a combination of silica, alumina, and borosilicate fibers, or such as Boeing Rigid Insulation™ (BRI), a combination of about 67% silica, about 33% alumina, and about 0.25% boron carbide or borate derivatives thereof, available from The Boeing Company, Chicago, Ill.

The tile is provided in a form from about 1 to several inches thick, and may be from several inches to several feet in length and width. The tiles are typically flat edged and block shaped (e.g. 6'×6"×2", FIG. 4), though the tiles may be machined into an extremely wide variety of shapes. The tiles are generally extremely lightweight, from about 6 lbs/ft³ to about 20 lbs/ft³, and extremely porous, containing up to 96% free space by volume.

Uncoated tiles, such as LI-900™ and AETB, are well known in the art and are in common commercial production. Information on the production of AETB material may be found in Leiser et al., "Options for Improving Rigidized Ceramic Heatshields", Ceramic Engineering and Science Proceedings, 6, No. 7–8, pp. 757–768 (1985) and Leiser et al., "Effect of Fiber Size and Composition on Mechanical and Thermal Properties of Low Density Ceramic Composite Insulation Materials", NASA CP 2357, pp. 231–244 (1934). Information on the production of BRI material maybe found in U.S. Pat. No. 6,716,782, entitiled LOW-CONDUCTIVITY AND LOW-DENSITY CERAMIC FIBER INSULATION AND METHOD OF PRODUCING SAME, filed Aug. 16, 2002.

Referring to FIG. 2, to begin the coating process, the tile is contacted with the sol mixture 20. The sol mixture may be sprayed on, brushed on, or applied to the tile in a wide variety of ways. The preferred method of contacting the sol with the tile is to partially or completely submerge the tile within the sol mixture. When contacted with the sol, the pores within the tile support a capillary effect, which causes the sol mixture to wick from the surface to the internal portions of the tile. Thus, the sol is able to penetrate into the body of the tile and surround the ceramic fibers that make up the interior of the tile structure. The degree to which the sol penetrates the tile depends upon the porosity of the tile, the viscosity of the sol mixture, and the time allowed for penetration. Usually, the sol wicks into a given porous body within seconds due to the strong capillary forces.

As mentioned, the viscosity of the sol may be adjusted prior to introduction into the tile by heating and partially polymerizing 18 the gelling agent of the sol. The partial polymerization allows control of its viscosity. The viscosity of the sol will determine, in part, the penetration depth of the sol when it is contacted with the insulation tile, with higher viscosity mixtures resulting in a reduced penetration depth and longer infiltration times. The sol is preferably impregnated into the tile at an elevated temperature near the temperature of the boiled sol.

Depending upon the thickness and density of the tile, the viscosity of the sol, and the amount of sol used, the sol may naturally penetrate the full thickness of the tile or may only penetrate a partial thickness of the tile. In the case of partial penetration, it is desired that the portion of the tile constituting the back face of the tile, or that portion of the tile which will comprise the inner mold line of a vehicle, be coated at the expense of the outer face of the tile. This is because, depending on the transition metal oxide used, metal oxide coating can degrade at temperatures above 2000° F., which is lower than the temperatures experienced by the outer surface of tiles located on some areas of reusable launch vehicles such as the space shuttle. Coatings on fibers in the portions of the tile close to the inner mold line are protected by the outer portions of the insulation and therefore do not degrade.

By way of example, a ceramic tile having a total free volume of 1000 ml will consume up to 1000 ml sol mixture. If less than that amount is used, the volume differential is left untreated and the location of the untreated area can be controlled by directional impregnation.

The capillary forces are usually sufficient to wick an entire workpiece. However, a vacuum or apparatus allowing the application of pressure to the workpiece may be used to aid in the impregnation step. Referring to FIGS. 3a and 3b, a vacuum source may be supplied on the side of the bare ceramic tile specimen opposite the supply of sol such that the sol is effectively sucked into the porous tile to partially or completely infiltrate the tile as desired. Alternatively, pressure may be applied to the solution outside of the bare ceramic tile specimen such that the pressure drives the sol partially or completely into the tile.

It has been found that favorable impregnation is facilitated by optionally thermally pretreating the ceramic tile by heating the tile to a temperature of approximately 1200° F. for a period of about 15 to about 30 minutes prior to impregnation with the sol mixture. This heat treatment step is optionally carried out prior to sol impregnation of the tile.

After the sol mixture is allowed to penetrate the tile to the desired degree, the gelling agent within the mixture is polymerized within the tile by heating the tile to a temperature of approximately 200° F. and then raising the temperature to approximately 900° F. over a 12 to 24 hour period. At this temperature, the tetra-alkoxy silane gelling agent begins to polymerize. The polymerization of the gelling agent is temperature and time dependent, and will continue until a high degree of polymerization has been reached. Because of the polymerization, the liquid sol becomes a very viscous fluid, and eventually solidifies within the tile.

After the sol mixture is allowed to penetrate the tile to the desired degree, the silane gelling agent is polymerized 22 within the tile by initially heating the tile to a temperature of approximately 200° F. and then increasing the temperature to approximately 900° F. over a 12 to 24 hour period. Polymerization within thicker tiles will take considerably longer than the polymerization within thinner tiles. Due to the polymerization of the gelling agent, the liquid sol becomes a very viscous fluid, and eventually solidifies within the tile.

In practice, the gelling agent of the sol may be conveniently polymerized 22 within the tile by first soaking the tile with the solution and placing the tile about 0.25" above a hotplate. The tile is usually placed in a glass tray and pre-made gel is placed underneath and around the tile. The excess gel prevents any of the solution from exiting the tile while drying. The hotplate is placed on a "high" setting of about 900° F. The insulative tile slowly absorbs heat from the hotplate and the temperature of the tile begins at about 200° F. and increases to about 900° F. towards the end of the gelling period.

After solidification of the gelling agent, the particulate transition metal oxide precursors are held well dispersed within the polymer matrix. The dispersion of the precursors allows the transition metal components to evenly coat the fibers within the insulation when oxidized. Without the solidification of the gelling agent, the sol and the transition metal oxide precursors would be driven out of the insulation due to the elevated temperatures and the ease with which the sol and precursors escape from the porous material.

Subsequent to the silane polymerization heat treatment, the tile is optionally heated for about 24 hours at about 250° F. to about 300° F. to remove the remaining solvents 24 and the alcohol formed from hydrolysis of the used alkoxy gelling agent.

The transition metal oxide precursors are converted to their oxide phase 26 after the gelling agent has polymerized and substantially solidified and after the solvents and alcohol have been allowed to escape the tile. To achieve conversion to the oxide phase, the temperature of the tile is raised from the silane polymerization temperature to a conversion temperature. At the conversion temperature, the transition metal oxide precursor decomposes to form a transition metal oxide phase. The temperature required to induce the conversion depends most heavily upon the substituent of the precursor to be replaced by oxygen. For instance, nitrate precursors may be oxidized between about 200° F. and about 500° F., while chloride precursors require a temperature of approximately 1500° F. for complete conversion to occur.

Transition metal oxides and oxide mixtures with very high thermal stability and melting points are preferred. Examples include but are not limited to $Fe_2O_3$, MnO, CoO, NiO, and $Cr_2O_3$ with thermal stability up to 2850° F., 2920° F., 3300° F., 3550° F., and 4350° F. respectively. Particularly preferred oxide mixtures are $Ni_{0.88}Mn_{1.12}O_4$, depending on the oxidation state of the Mn, and $Y_{1.8}Ca_{0.1}Fe_{0.8}V_{0.2}O_4$, both spinel systems, and $Ce_{0.9}Ca_{0.1}Fe_{0.8}Ni_{0.2}O_3$, a perovskite system, all of which incorporate the silica from the TEOS gelling agent to form a complex silicate material layer.

Although identified in two separate steps, it should be realized that polymerization of the gelling agent and conversion of the precursor to the oxide may occur simultaneously. For instance, nitrates are at least partially decomposed at the 200° F. temperature required for completion of the polymerization of tetra-ethoxy silane.

Further heating 26 at temperatures above about 200° F. completes the transformation of the silicon containing gelling agent (alkoxy silane) into a silica matrix which contains the transition metal oxides and which chemically bonds to the silicate, aluminate, borosilicate, or other ceramic fibers within the insulation. Thus, the ceramic fibers within the resulting insulation are coated with well dispersed transition metal oxides which are bonded to the fibers in such a manner that the coating is not removed by temperature cycling or turbulence encountered during flight of an insulated vehicle. In this manner, the coating becomes an integral part of the ceramic fibers themselves.

Because the transition metal oxides are bonded as a thin layer (nm–μm range thickness) to the individual fibers of the insulation, the pores of the insulation are not clogged. The insulating properties of the tile are unaffected by the coating process other than the fact that the coating renders the fibers largely opaque to thermal radiation. The path for direct shine through, or transmission, of radiation through the tile is blocked. The radiation that encounters the coating is either reflected or scattered, and reduction of radiation transmittance may reach up to 100%.

The coatings do not substantially alter the physical properties of the insulation tile, including the ability of the tile to resist physical stress. In addition, weight added to the insulation tile by the coating material is minimal, at between 0.5 lbs/ft3 and 0.8 lbs/ft$^3$. Further, the coating is compatible with toughened unipiece fibrous insulation (TUFI) and reaction cured glass (RCG) tile coatings which are commonly used with AETB tiles to improve strength and impact resistance. The TUFI and RCG coatings may be applied to the coated tile by methods previously known in the art of placing TUFI and RCG layers upon AETB materials.

Thus, use of the invented coating and coated ceramic insulation material provides a ceramic insulation having reduced infra-red shine-through without adversely affecting the mechanical properties of the uncoated insulating material.

EXAMPLES

Example 1

BRI 8 lbs/ft$^3$ Tile With Ni/Mn Transition Metal (BRI-8-21-NiMn-2)

As a transition metal precursor, 14 g Ni(NO$_3$)$_2$*6H$_2$O and 7 g MnCO$_3$ were used. The MnCO$_3$ was dissolved using 140 ml HCl and 35 ml HNO$_3$. The precursor was added to 5 ml hydrochloric acid (conc.: 30–40% w/w) in 560 ml water. As a gelling agent, 49 ml TEOS was added to 70 ml Isopropyl Alcohol. The TEOS solution and the precursor solutions were then mixed and stirred on the hot plate. The solution was heated until boiling with a watch glass on top to prevent the majority of vapor from escaping. The solution was heated for 80 minutes until the first signs of gelling occurred. The solution was poured into an aluminum tray and an BRI tile having a density of 8 lbs/ft$^3$ was placed inside the tray. The tile was left approximately 0.25 inch above the hotplate at full power overnight to complete gelling. The tile was then dried at 285° F. overnight and then fired at 1500° F. for 20 minutes. The fibers of the resulting tile were coated with a combination of Ni and Mn transition metal oxides. The predominant form of the oxide is believed to be Ni$_{0.88}$Mn$_{1.12}$O$_4$. The tile was then coated with TUFI and RCG.

Example 2

BRI 8 lbs/ft$^3$ Tile With Y/Fe/V Transition Metal (BRI-8-17-SPIN-2)

As a transition metal precursor, 14 g Y(CHCOO)$_3$*4 H$_2$O, 1.1 g Ca(NO$_3$)$_2$*4 H$_2$O, 7.5 g Fe(NO$_3$)$_3$*6 H$_2$O, and 1.1 g NH$_4$VO$_3$ are added to 5 ml hydrochloric acid (conc.: 30–40% w/w) in 500 ml water. As a gelling agent, 49 ml TEOS was added to 70 ml Isopropyl Alcohol. The TEOS solution and the precursor solutions were then mixed and stirred on the hot plate. The solution was heated until boiling with a watch-glass on top to prevent the majority of vapor from escaping. The solution was heated for 90 minutes until the first signs of gelling occurred. The solution was poured into an aluminum tray and a BRI tile having a density of 8 lbs/ft$^3$ was placed inside the tray. The tile was left approximately 0.25 inch above the hotplate at full power overnight to complete the gelling. The tile was then dried at 285° F. overnight and then fired at 1500° F. for 20 minutes. The fibers of the resulting tile were coated with a combination of Y, Fe, and V transition metal oxides. The predominant form of the oxide is believed to be Y$_{1.8}$Ca$_{0.1}$Fe$_{0.8}$V$_{0.2}$O$_4$. The tile was then coated with TUFI and RCG.

Example 3

BRI 8 lbs/ft$^3$ Tile With Ce/Fe/Ni Transition Metal (BRI-8-10-PR-1)

As a transition metal precursor, 9.4 g Ce(NO$_3$)$_3$*6 H$_2$O, 0.6 g Ca(NO$_3$)$_2$*4 H$_2$O, 6.7 g Fe(NO$_3$)$_3$*6 H$_2$O, and 1.4 g Ni(NO$_3$)$_2$ were added to 18 ml nitric acid (conc.: 80–90% w/w) in 540 ml water. As a gelling agent, 42 ml TEOS were added to 60 ml Isopropyl Alcohol. The TEOS solution and the precursor solutions were then mixed and stirred on the hot plate. The solution was heated until boiling with a watch-glass on top to prevent the majority of vapor from escaping. The solution was heated for 90 minutes until the first signs of gelling occurred. Solution was poured into an aluminum tray and a BRI tile having a density of 8 lbs/ft$^3$ was placed inside the tray. The tile was left approximately 0.25 inch above the hotplate at full power overnight to complete the gelling. The tile was then dried at 285° F. overnight and then fired at 1500° F. for 20 minutes. The fibers of the resulting tile were coated with a combination of Ce, Fe, and Ni transition metal oxides. The predominant form of the oxide is believed to be Ce$_{0.9}$Ca$_{0.1}$Fe$_{0.8}$Ni$_{0.2}$O$_3$. The tile was then coated with TUFI and RCG.

In order to compare the insulative properties of each tile, a series of radiant heat tests were performed with the main result being a back face temperature response (BFTR). FIGS. 4 and 5 illustrate the setup and how the measurements were taken. The BFTR corresponds to the highest temperature the underlying structure would see during operation. If a tile had good insulative properties, the BFTR would be low, and vice versa. Each run was done under the same conditions, 2300° F. for 11 minutes at 7.6 torr pressure. Measured is the maximum backsoak temperature at the inner mold line of the test article.

Radiant heat tests were performed on 6"×6"×2" tile specimens under 7.6 torr pressure at 2300° F. for 11 minutes while measuring the back face temperature response until it has passed its maximum. During testing, the tile having a transition metal oxide coating therein and a RCG coating on the outer mold line surface of the tile 102 and a TUFI coating on the side surfaces of the tile 104 theron was placed in a glass rock insulation chamber 82 adjacent to and abutting comparable tile insulation 84 with gap filler 85 in between each tile so as to form an insulative layer between a series of ultraviolet heat lamps 86 at the top of the chamber and the "insulated" surface of the bottom of the chamber. The tile was placed upon an aluminum plate 88 and thermocouples were placed along the outer mold line (OML) 90 and at the center of the strain isolation pad (SIP) 92. Heat was applied by the heat lamps and temperatures at the thermocouples was recorded. The results of the tests are shown in Table 1, below. A graphical representation of the heat profile of the tile of Example 3 is shown in FIG. 6.

TABLE 1

Comparison of Infiltration Depth with BFTR Performance Improvements

| Formulation | Weight Gain | Infiltration Depth | BFTR of Uncoated Tile Baseline | BFTR of Coated Tile | Temperature Decrease |
|---|---|---|---|---|---|
| SPIN-2 | 19.3 g | 0.1–0.2" | 570° F. | 535° F. | −35 F. |
| PR-1 | 13.7 g | 0.2–0.4" | 553° F. | 498° F. | −55 F. |
| Ni/Mn-2 | 17.4 g | 0.5–0.9" | 564° F. | 454° F. | −110 F. |

As shown by Table 1, ceramic tiles coated with transition metal oxides in accordance with the invention exhibited dramatically improved back face temperature response over untreated tiles. In the test conducted above, the coatings reduced the back face temperature of the insulative tiles anywhere from 35° F. to 110° F.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of coating the fibers of fibrous insulation material comprising:
providing a body of ceramic fibrous insulation;
providing a sol comprising a tetra-alkoxy silane, water, alcohol, and a transition metal oxide precursor salt;
impregnating the insulation with said sol;
polymerizing the sol to form a silica matrix;
heating the sol until the precursor salt is at least partially converted to an oxide phase and at least partially incorporated within the silica matrix within the insulation; and
applying a coating of toughened unipiece fibrous insulation (TUFI) and reaction cured glass (RCG) to the insulation.

2. The method of claim 1 wherein the step of providing a sol comprises providing a sol comprising a tetra-alkoxy silane and a transition metal oxide precursor selected from the group consisting of halide, nitrates, carbonates, sulfates, acetates, formiates, and alkoxides of transition metals.

3. The method of claim 2 wherein the step of providing a sol comprises providing a sol comprising a tetra-alkoxy silane and a transition metal nitrate.

4. The method of claim 1 wherein the step of providing a sol comprises providing a sol comprising a transition metal oxide precursor salt and a tetra-alkoxy silane selected from the group consisting of tetra-ethoxy silane and tetra-methoxy silane.

5. The method of claim 1 wherein the step of impregnating the insulation comprises allowing the sol to penetrate into the porous regions of the insulation to at least a partial thickness of the insulation.

6. The method of claim 1, wherein the step of impregnating the insulation with said sol comprises immersing the insulation into said sol and allowing the sol to wick into the material of the insulation.

7. The method of claim 1, wherein the step of impregnating the insulation with said sol comprises applying a vacuum to the insulation, thereby drawing said sol into the insulation.

8. The method of claim 1, wherein the step of impregnating the insulation with said sol comprises applying pressure to the sol, thereby driving the sol into the insulation.

9. The method of claim 1 wherein the step of polymerizing the sol comprises heating the sol to a temperature of about 200° F. and increasing to a temperature of about 900° F. over a period of about 12 to about 24 hours.

10. The method of claim 9, further comprising the step of: maintaining the sol at a temperature of about 250° F. to about 300° F. until substantially all of the byproducts of the silane polymerization are expelled from the insulation.

11. The method of claim 9, further comprising the step of: maintaining the sol at a temperature of about 250° F. to about 300° F. for a period of about 24 hours.

12. The method of claim 9, further comprising the step of: heating the sol to a temperature between about 200° F. and about 1500° F. to convert substantially all the transition metal oxide precursor into a transition metal oxide phase.

13. The method of claim 12, wherein the transition metal oxide precursor is a nitrate and the precursor is converted to the oxide phase between about 200° F. and about 500° F.

14. The method of claim 12, wherein the transition metal oxide precursor is a chloride and the precursor is converted to the oxide phase at about 1500° F.

15. The method of claim 1, wherein the precursor salt comprises at least two transition metal components.

16. The method of claim 1, wherein the sol comprises from about 2% to about 5% transition metal oxide precursor, about 4% to about 10% alkoxy silane, about 75% to about 85% water, about 7% to about 9% alcohol, and about 1% to about 3% acid.

17. The method of claim 16, wherein the sol comprises from about 2.5% to about 3.5% transition metal oxide precursor, about 5.7% tetra-ethoxy silane, about 80% water, about 8.1% isopropanol, and about 2.7% acid.

18. The method of claim 1, wherein the sol comprises from about 2% to about 5% transition metal oxide precursor, about 4% to about 10% alkoxy silane, about 75% to about 85% water, about 7% to about 9% alcohol, and about 1% to about 3% base.

19. The method of claim 1, further comprising preheating the sol prior to impregnating the insulation, thereby
partially polymerizing and increasing the viscosity of the tetra-alkoxy silane.

20. The method of claim 19 wherein preheating takes place at a temperature between about 200° F. and 500° F.

21. The method of claim 20, wherein the preheating takes place at the boiling temperature of the sol for a period of about 60 to about 90 minutes.

22. A method of coating the fibers of fibrous insulation material comprising:
providing a body of ceramic fibrous insulation;
providing a sol comprising a tetra-alkoxy silane, water, alcohol, and a transition metal oxide precursor salt;
impregnating the insulation with said sol;
polymerizing the sol to form a silica matrix;
heating the sol until the precursor salt is at least partially converted to an oxide phase and at least partially incorporated within the silica matrix within the insulation, and wherein the ceramic fibrous insulation comprises about 67% silica fibers, about 33% alumina fibers, and about 0.25% boron carbide and borate derivatives thereof.

23. A method of producing a ceramic fiber insulation tile, comprising:
providing a sol comprising a tetra-alkoxy silane gelling agent, a transition metal oxide precursor salt, water, alcohol, and acid;
providing a porous ceramic fiber insulation tile comprising greater than 60% silica fibers and greater than 15% alumina fibers;
at least partially impregnating the insulation with the sol;
polymerizing the gelling agent;
converting at least a portion of the transition metal oxide precursor to a transition metal oxide phase; reacting the polymerized gelling agent into a silica matrix which is bonded to the ceramic fiber of the insulation and which contains the transition metal oxides; and applying a coating of toughened unipiece fibrous insulation (TUFI) and reaction cured glass (RCG) to the insulation.

24. A fibrous insulation material comprising:
an insulative insulation comprising a mixture of ceramic fibers, and
a coating on said fibers comprising a polymerized silica matrix containing transition metal oxides, wherein the insulation has a density of between 8 lbs/ft$^3$ and 20 lbs/ft$^3$ and wherein the tile is coated with toughened unipiece fibrous insulation (TUFI) and reaction cured glass (RCG).

25. The material of claim 24, wherein the ceramic fibers are selected from alumina, silica, borosilicate, or combinations thereof.

26. The material of claim 24, wherein the insulation has a density of between 8 lbs/ft$^3$ and 16 lbs/ft$^3$.

27. The material of claim 24, wherein the insulation has a thickness between about 1 and about 12 inches.

28. A fibrous insulation material comprising:
an insulative insulation comprising a mixture of ceramic fibers, and
a coating on said fibers containing transition metal oxides, wherein the insulation has a density of between 8 lbs/ft$^3$ and 20 lbs/ft$^3$ and wherein the ceramic fibers are about 67% silica fibers, about 33% alumina fibers, and about 0.25% boron carbide or borate derivatives thereof.

29. A fibrous insulation material comprising:
an insulative insulation comprising a mixture of ceramic fibers, and
a coating on said fibers comprising a polymerized silica matrix containing transition metal oxides, wherein the insulation has a thickness between about 1 and about 12 inches, and wherein the ceramic fibers are about 67% silica fibers, about 33% alumina fibers, and about 0.25% boron carbide or borate derivatives thereof.

30. The material of claim 29, wherein the insulation has a density of between 8 lbs/ft$^3$ and 16 lbs/ft$^3$.

31. The material of claim 29, wherein the insulation is coated with toughened unipiece fibrous insulation (TUFI) and reaction cured glass (RCG).

* * * * *